United States Patent
Murayama et al.

(10) Patent No.: US 8,253,980 B2
(45) Date of Patent: Aug. 28, 2012

(54) DATA PROCESSING DEVICE, INK JET PRINTING SYSTEM AND DATA PROCESSING METHOD

(75) Inventors: Yoshiaki Murayama, Tokyo (JP); Kiichiro Takahashi, Yokohama (JP); Minoru Teshigawara, Yokohama (JP); Tetsuya Edamura, Kawasaki (JP); Akiko Maru, Tokyo (JP); Takatoshi Nakano, Tokyo (JP); Hiroshi Taira, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 12/187,732

(22) Filed: Aug. 7, 2008

(65) Prior Publication Data

US 2009/0051940 A1 Feb. 26, 2009

(30) Foreign Application Priority Data

Aug. 20, 2007 (JP) ................. 2007-214040

(51) Int. Cl.
*G06K 15/00* (2006.01)
(52) U.S. Cl. ............... 358/3.06; 358/3.27; 358/3.01; 347/12; 347/15; 382/100
(58) Field of Classification Search ......... 358/3.06, 358/3.27, 3.01; 347/12, 15; 382/100
See application file for complete search history.

(56) References Cited

U.S. PATENT DOCUMENTS

| | | | |
|---|---|---|---|
| 6,682,170 B2 | 1/2004 | Hotomi et al. | |
| 6,846,066 B2 | 1/2005 | Teshikawara et al. | |
| 6,877,833 B2 | 4/2005 | Teshigawara et al. | |
| 7,079,283 B2 | 7/2006 | Otsuka et al. | |
| 7,320,510 B2* | 1/2008 | Nakamura et al. | 347/15 |
| 7,477,422 B2* | 1/2009 | Konno et al. | 358/3.06 |
| 7,762,640 B2* | 7/2010 | Kanda et al. | 347/12 |
| 8,014,559 B2* | 9/2011 | Ishii | 382/100 |
| 2004/0090480 A1* | 5/2004 | Teshikawara et al. | 347/15 |
| 2008/0304108 A1* | 12/2008 | Kimura | 358/3.27 |

FOREIGN PATENT DOCUMENTS

| | | |
|---|---|---|
| JP | 10-278244 A | 10/1998 |
| JP | 2002-301815 A | 10/2002 |
| JP | 2004-148723 A | 5/2004 |

* cited by examiner

*Primary Examiner* — Twyler L. Haskins
*Assistant Examiner* — Michael Burleson
(74) *Attorney, Agent, or Firm* — Fitzpatrick, Cella, Harper & Scinto

(57) ABSTRACT

To enable the printing in which it is difficult for the dot to stand out and it is difficult for the gradation sequence properties to be degraded. Therefore, among plural dots each having a different size, the binary processing is carried out by using the same first dot arrangement pattern in regard to the large and medium-sized dots and the binary processing is carried out by using a dot arrangement pattern different from the first dot arrangement pattern in regard to the small-sized dots.

15 Claims, 14 Drawing Sheets

LEVEL 0 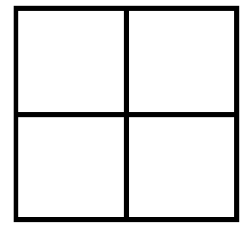
LEVEL 1 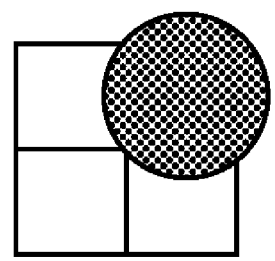
LEVEL 2 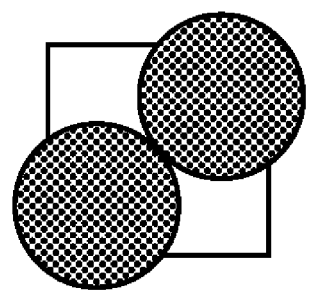
LEVEL 3 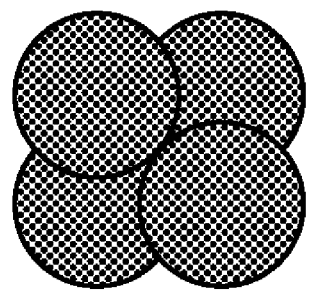
FIG.8

LEVEL 0 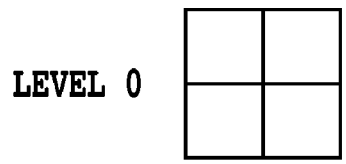
LEVEL 1 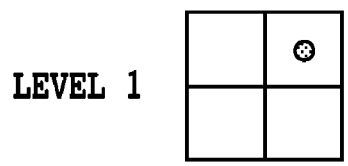
LEVEL 2 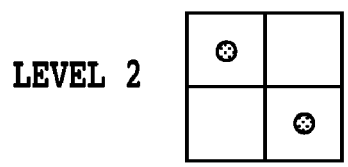
LEVEL 3 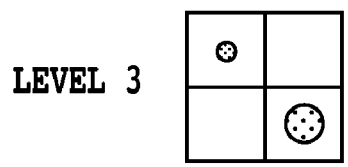
LEVEL 4 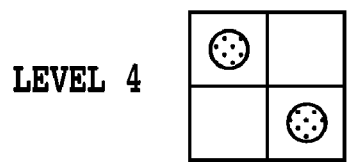
LEVEL 5 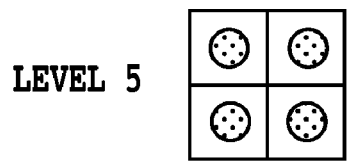
⊙ EXTREMELY SMALL-SIZED DOT
🔵 SMALL-SIZED DOT
FIG.9

|  | LARGE/MEDIUM/SMALL-SIZE SAME INDEX | LARGE/MEDIUM/SMALL-SIZE INDEPENDENT INDEX |
|---|---|---|
| ADVANTAGE | INPUT START OF DOT IN A DIFFERENT DISCHARGE AMOUNT TENDS TO BE INDISTINCTIVE | GRADATION SEQUENCE PROPERTIES AT INPUT START OF DOT IN A DIFFERENT DISCHARGE AMOUNT IS DIFFICULT TO BE DEGRADED |
| DISADVANTAGE | GRADATION SEQUENCE PROPERTIES AT INPUT START OF DOT IN A DIFFERENT DISCHARGE AMOUNT ARE EASILY DEGRADED | INPUT START OF DOT IN A DIFFERENT DISCHARGE AMOUNT TENDS TO BE DISTINCTIVE |

FIG.10

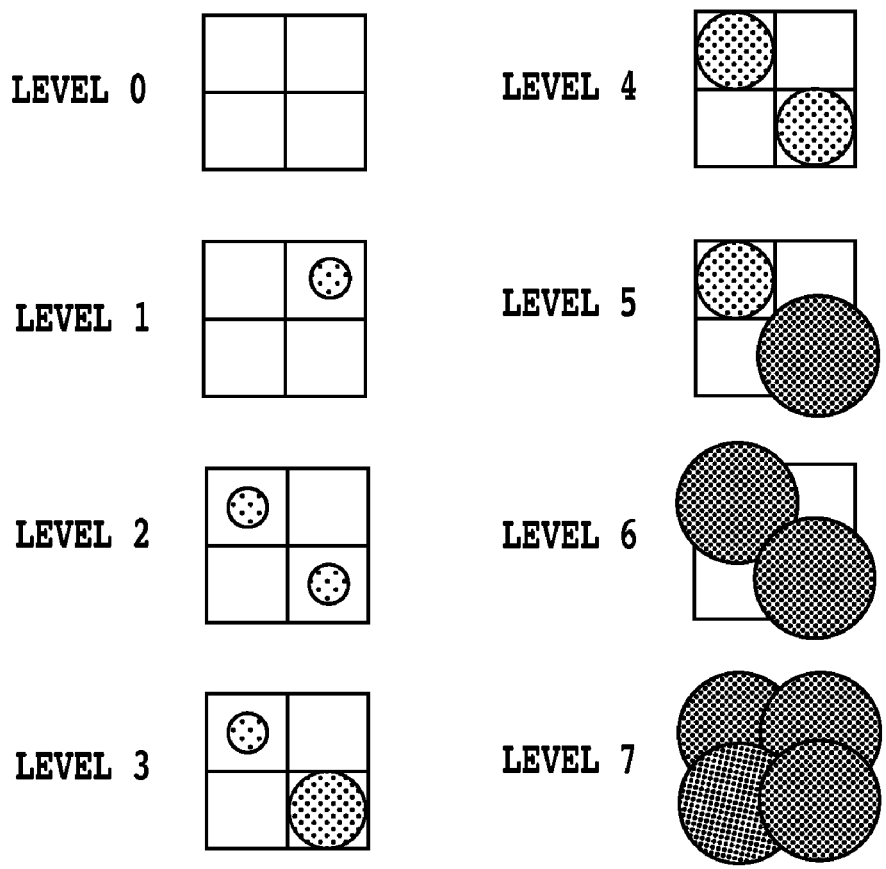
| | | | |
|---|---|---|---|
|LEVEL 0| |LEVEL 4| |
|LEVEL 1| |LEVEL 5| |
|LEVEL 2| |LEVEL 6| |
|LEVEL 3| |LEVEL 7| |
 SMALL-SIZED DOT
 MEDIUM-SIZED DOT
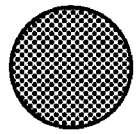 LARGE-SIZED DOT
FIG.11

DATA PROCESSING DEVICE, INK JET PRINTING SYSTEM AND DATA PROCESSING METHOD

BACKGROUND OF THE INVENTION

1. Field of the Invention

The present invention relates to a data processing device, a program, an ink jet printing system and a data processing method which generates data for performing printing in different ink ejection volumes (ink dots in different sizes).

2. Description of the Related Art

In an ink jet printing device, there has been recently made an attempt for forming an image with a higher quality by making a size of a record droplet small. As one example of the ink jet printing device, there is known a printing device which applies ink of the same color with plural ejection volumes to carry out the printing, thus carrying out both of high-quality printing and high-speed printing.

Image data used in this ink jet printing device are acquired by finally converting image data in which the gradation sequence is expressed in the form of a multi-value (for example, 256 gradation sequence levels from 0 to 255 of 8 bits) for each pixel into binary image data. More specially, the image data of 256 values of 8 bits are once converted into N-value data (for example, four-value data) of plural bits (for example, two bits) expressing the gradation sequence of several levels. This conversion is called quantization. Based upon a level expressed by the quantized N-value data, a dot matrix pattern in advance addressed to the level is selected and binary image data for forming dots of the selected pattern are generated. The gradation sequence properties and the maximum density in printing can be set by appropriately defining the dot number and the dot arrangement in the dot matrix pattern. It should be noted that the dot matrix pattern means a dot arrangement pattern defining the arrangement of dots. Hereinafter, "dot matrix pattern" is also called "dot arrangement pattern".

A concrete example of this method will be explained with reference to an example of a printing device which can record large, medium and small-sized dots. First, in regard to each of the large, medium and small-sized dots, the image data of 256 gradation sequence levels of 0 to 255 are quantized to four-value data (levels of 0 to 3) expressed in 2 bits. Next, the four-value data corresponding to each of the large, medium and small-sized dots are converted into 2-value data with the dot matrix pattern corresponding to any of levels of 0 to 3 shown in FIG. 12. As described above, this construction independently defines an arrangement of each of the large, medium and small-sized dots in regard to each level of the four levels (levels of 0 to 3). That is, the large, medium and small-sized data can be independently quantized. In the present specification, quantization data acquired by such an independent quantization (for example, index data showing each level for expressing the large, medium and small-sized dot data as shown in FIG. 12 as an independent pattern) are defined as a large, medium and small-size dot independent index. A method for independently generating data of dots in different sizes by using different dot matrix patterns respectively is disclosed by Japanese Patent Laid-Open No. 2004-148723 or Japanese Patent Laid-Open No. 2002-301815.

On the other hand, in the large, medium and small-size independent index, the large, medium and small-size dot data respectively are independently quantized, but the image data of a multi-value are quantized using the same matrix pattern, making it possible to generate dot data of the large, medium and small sizes. In a case of this construction, first, the image data of 256 gradation sequence levels from 0 to 255 corresponding to the same color are quantized to eight-value data (levels 0 to 7) expressed by 4 bits. Next, the eight-value data are converted into binary data by the dot matrix pattern (mixing pattern of large, medium and small-sized dots) corresponding to any of levels 0 to 7 as shown in FIG. 11. As described above, in this construction, the large, medium and small-size dot data are quantized together. In the present specification, quantization data acquired by such same quantization (for example, index data showing each level for expressing the large, medium and small-size dot data as shown in FIG. 11 as a mixing pattern) are defined as a large, medium and small-size dot same index. A method for generating data of dots in different sizes by using a single dot matrix pattern is disclosed by Japanese Patent Laid-Open No. 10-278244 (1998).

However, the large, medium and small-size same index and the large, medium and small-size independent index respectively have an advantage and a disadvantage in printing. FIG. 10 is a diagram summarizing the advantage and disadvantage of each. In addition, FIG. 11 is a diagram showing the dot matrix patterns by the large, medium and small-size same index and FIG. 12 is a diagram showing the dot matrix patterns by the large, medium and small-size independent index. Each dot matrix pattern is a dot matrix pattern of 2×2 in which one pixel has a size of 600 dpi (lateral)×600 dpi (vertical).

In the large, medium and small-size same index shown in FIG. 11, the same quantization processing is carried out for generating the large, medium and small-size dot data and the dot matrix pattern defines a position relation of the large, medium and small-sized dots in a pixel unit. Therefore, for example, in the connection section of the gradation sequence between a level where small-sized dots only are used (level 2 in FIG. 11) and a level where an medium-sized dot and a small-sized dot are mixed (level 3 in FIG. 11), an arrangement where the medium-sized dot and the small-sized dot are difficult to be overlapped can be defined. Likewise, in the connection section of the gradation sequence between a level where medium-sized dots only are used (level 4 in FIG. 11) and a level where an medium-sized dot and a large-sized dot are mixed (level 5 in FIG. 11), an arrangement where the medium-sized dot and the large-sized dot are difficult to be overlapped can be defined. In the dot pattern where the medium-sized dot and the small-sized dot are mixed or the medium-sized dot and the large-sized dot are mixed, when the dots are overlapped with each other, density of the dot is increased. Therefore, the dot is easy to be recognized in the record result, leading to an improvement on granular feelings. However, since in the large, medium and small-size same index, the arrangement where the medium-sized dot and the small-sized dot or the medium-sized dot and the large-sized dot are difficult to be overlapped can be defined, the granular feeling which may be the problem in a density region (gradation sequence level) where dots in different sizes start to be mixed can be reduced.

However, in a case of the large, medium and small-size same index, when an ejection volume of the medium-sized dot or the small-sized dot varies due to external factors to make almost no difference in ejection volumes between the medium-sized dot and the small-sized dot, the gradation sequence properties tends to be degraded. That is, when almost no difference in ejection volumes between the medium-sized dot and the small-sized dot is made, for example, a difference in an ink amount between level 2 and level 3 in FIG. 11 is made small. Since the dot arrangement of the medium-sized dot and the small-sized dot is defined in a pixel unit, the sufficient density is not produced in level 3 where the small-sized dot in level 2 is replaced by the medium-sized dot and the gradation sequence properties in the connection section of the gradation sequence between level 2 and level 3 tend to be degraded. The same problem may take place in the connection section of the gradation sequence from the medium-sized dot to the large-sized dot.

On the other hand, in the large, medium and small-size independent index shown in FIG. 12, the large, medium and small-sized dot data are independently quantized and the dot matrix pattern is defined to each of the large, medium and small-sized dots. Therefore, in the connection section of the gradation sequence from the small-sized dot to the medium-sized dot or in the connection section of the gradation sequence from the medium-sized dot to the large-sized dot, it can be freely determined from which level the input of the medium-sized dot or the large-sized dot starts to be made. In this case, even if an ejection volume of the medium-sized dot or the small-sized dot varies due to external factors, the gradation sequence properties are difficult to be degraded. This can be true of the connection section of the gradation sequence from the medium-sized dot to the large-sized dot.

However, in the large, medium and small-size independent index, the large, medium and small-sized dots are independently quantized and the dot matrix pattern is independently allotted to each of the large, medium and small-sized dots. Therefore, the position relation in a state where the large, medium and small-sized dots are mixed can not be defined. In consequence, when the gradation sequence where the small-sized dot only exists is shifted to the gradation sequence where the medium-sized dot and the small-sized dot are mixed, a portion where the medium-sized dot and the small-sized dot are overlapped is produced, so that start of the input of the medium-sized dot may stand out. When the gradation sequence where the medium-sized dot only exists is shifted to the gradation sequence where the medium-sized dot and the large-sized dot are mixed, the same phenomenon takes place.

As described above, the same index and the independent index respectively have the advantage and disadvantage. Therefore, in the conventional method of using only one of both, it is difficult to simultaneously achieve both of granular feeling reduction of the dot and gradation sequence properties in a density region (gradation sequence level) where the dot in a different size starts to enter in.

SUMMARY OF THE INVENTION

Therefore, the present invention is made in view of the forgoing problems and an object of the present invention is to be capable of reducing a granular feeling of a dot and simultaneously carrying out the printing in which gradation sequence properties are difficult to be degraded, in a density region (gradation sequence level) where the dot in a different size starts to enter in.

According to a first aspect of the present invention, a data processing device for generating binary data corresponding to a first dot, a second dot smaller than the first dot and a third dot smaller than the second dot comprises: binary processing means which generates the binary data corresponding to the first and second dots by using a first dot arrangement pattern based upon a first multi-value image data for forming the first and second dots and generates the binary data corresponding to the third dot by using a second dot arrangement pattern different from the first dot arrangement pattern based upon a second multi-value image data different from the first multi-value image data for forming the third dot.

According to a second aspect of the present invention, a data processing method for generating binary data corresponding to a first dot, a second dot smaller than the first dot and a third dot smaller than the second dot comprises: a step of generating the binary data corresponding to the first and second dots by using a first dot arrangement pattern based upon a first multi-value image data for forming the first and second dots; and a step of generating the binary data corresponding to the third dot by using a second dot arrangement pattern different from the first dot arrangement pattern based upon a second multi-value image data for forming the third dot.

According to a third aspect of the present invention, a data processing device for generating binary data corresponding to each of three kinds or more of dots each having a different size for forming the three kinds or more of the dots comprises: binary processing means which generates binary data corresponding to at least two kinds of dots by using a first dot arrangement pattern based upon a first quantization data for forming at least the two kinds of the dots and generates binary data corresponding to at least another kind of the dot by using a second dot arrangement pattern different from the first dot arrangement pattern based upon a second quantization data different from the first quantization data for forming at least another kind of the dot different from at least the two kinds of the dots.

According to a fourth aspect of the present invention, an ink jet printing system including an ink jet printing device for printing on a printing medium three kinds or more of dots each having a different size based upon a binary data corresponding to each of the three kinds or more of the dots for forming the three kinds or more of the dots and a host device connected to the ink jet printing device comprises: means which generates a first quantization data for forming at least two kinds of dots and generates a second quantization data different from the first quantization data for forming at least another kind of a dot different from at least the two kinds of the dots; and means which generates a binary data corresponding to at least the two kinds of the dot by using a first dot arrangement pattern based upon the first quantization data and generates a binary data corresponding to at least the another kind of the dot by using a second dot arrangement pattern different from the first dot arrangement pattern based upon the second quantization data.

According to a fifth aspect of the present invention, a data processing method for generating a binary data corresponding to each of three kinds or more of dots each having a different size for forming the three kinds or more of the dots comprises: a step for generating the binary data corresponding to at least two kinds of dots by using a first dot arrangement pattern based upon a first quantization data for forming at least the two kinds of the dots; and a step for generating the binary data corresponding to at least another kind of a dot by using a second dot arrangement pattern different from the first dot arrangement pattern based upon a second quantization data different from the first quantization data for forming at least the another kind of the dot different from at least the two kinds of the dots.

The present invention can carry out the printing in which a granular feeling of a dot can be reduced and gradation sequence properties are difficult to be degraded, in a density region (gradation sequence level) where the dot in a different size starts to enter in.

Further features of the present invention will become apparent from the following description of exemplary embodiments (with reference to the attached drawings).

BRIEF DESCRIPTION OF THE DRAWINGS

FIG. 8 is a diagram showing an independent index in yellow having large-sized dots only;

FIG. 9 is a diagram showing the same index having minimum small-sized dots and small-sized dots in a third embodiment;

FIG. 10 is a diagram summarizing an advantage and a disadvantage in a large, medium and small-size same index and a large, medium and small-size independent index respectively;

FIG. 11 is a diagram showing dot patterns in a large, medium and small-size same index;

DESCRIPTION OF THE EMBODIMENTS

First Embodiment

Hereinafter, a first embodiment of the present embodiment will be explained with reference to the drawings.
(Explanation of Printing Device Body)

An entire construction of an ink jet printing device (hereinafter, also simply referred to as printing device) to which the present invention can be applied will be explained.

Figure 1:
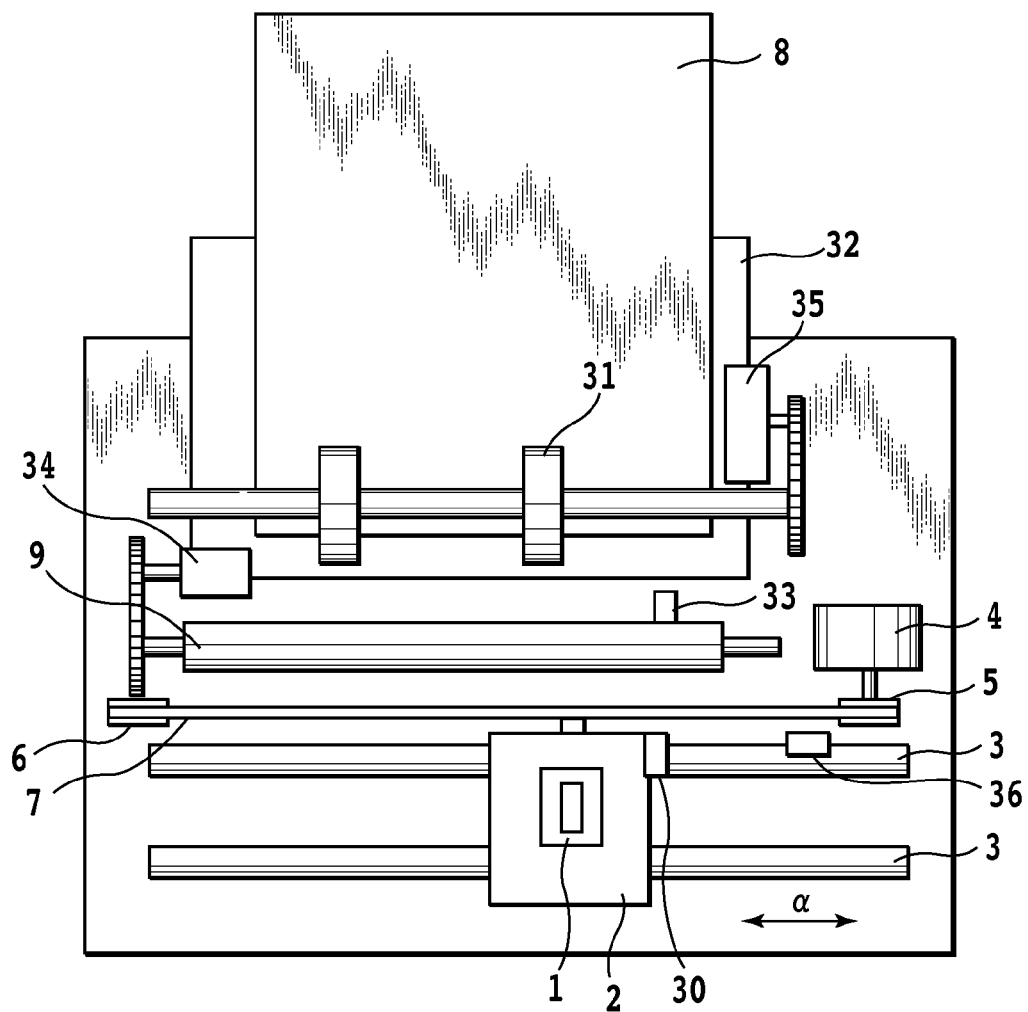
FIG. 1 is a diagram showing a basic construction of major mechanism parts of an ink jet printing device to which the present invention can be applied.

FIG. 1 is a diagram showing a basic construction of major mechanism sections in the ink jet printing device to which the invention can be applied. A head cartridge 1 is formed of a printing head part, an ink tank part, and a connector for receiving signals or the like for driving the printing head (not shown). In addition, the head cartridge 1 is mounted in a carriage 2 to be replaceable therein and the carriage 2 is provided with a connector holder (electrical connection portion) for transmitting a drive signal or the like to the head cartridge 1 through the connector.

The cartridge 2 is supported for guidance to be capable of reciprocating along a guide shaft 3 which extends in a main scanning direction a and is arranged in the device body. The cartridge 2 is driven through a drive mechanism such as a motor pulley 5, a driven pulley 6 and a timing belt 7 by a main scanning motor 4 and the position and the travel thereof are also controlled. In addition, a home position sensor 30 is attached in the carriage 2. Thereby, when the home position sensor 30 over the carriage 2 passes a shield plate 36, the position of the carriage 2 can be detected.

Record mediums 8 such as sheet or plastic thin plate are separately fed by one sheet each from an auto sheet feeder (hereinafter, also referred to as ASF) 32 by rotating a pickup roller 31 through a gear by a sheet feed motor 35. The record medium 8 passes through a position (print portion) opposing an ejection port face of the head cartridge 1 by rotation of a carriage roller 9 to be carried (sub-scanned). The rotation of the carriage roller 9 is carried out through a gear by rotation of a LF motor 34. On this occasion, a determination as to the sheet feeding and a confirmation of a head rewinding position at sheet feeding are carried out at a point where the record medium 8 passes a paper end sensor 33. Further, the paper end sensor 33 is also used for finding where a rear end of the record medium 8 is and for finally determining the present printing position from an actual rear end thereof.

It should be noted that the record medium 8 has a back surface which is supported by a platen (not shown) in such a manner as to form a flat printing surface in the printing section. On this occasion, each head cartridge 1 mounted in the carriage 2 is held so that an ejection port face thereof is in parallel with the record medium 8.

The head cartridge 1 is, for example, an ink jet head cartridge for discharging ink by using thermal energy and is provided with an electricity-heat conversion element for generation the thermal energy. That is, in the printing head of the head cartridge 1, power is supplied to the electricity-heat conversion element to generate heat therein. At this time, film boiling occurs in the ink and the ink is ejected through the ejection port by using air bubbles generated by the film boiling to carry out the printing. Without mentioning, the method for discharging the ink may include other methods such as a method for discharging the ink by a piezo element.

Figure 2:
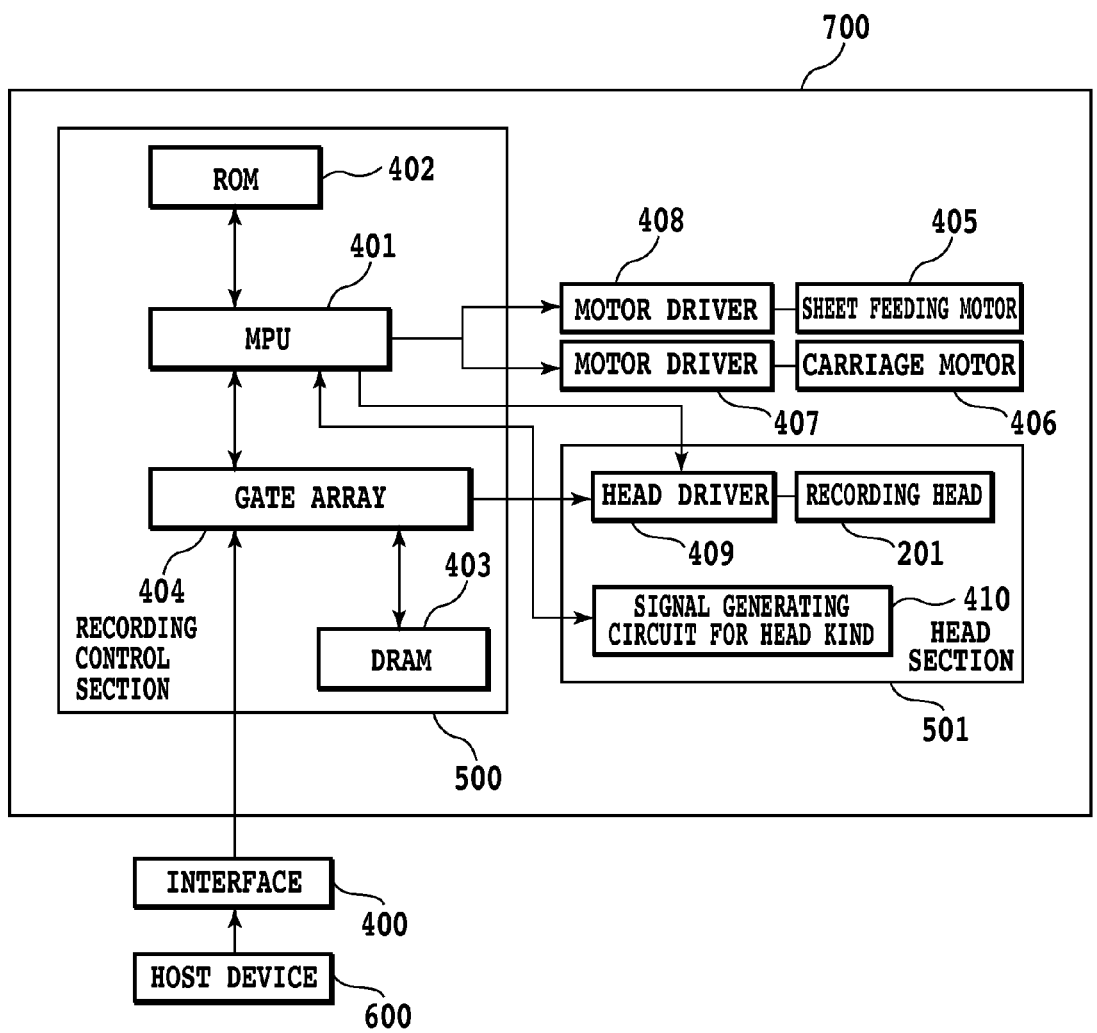
FIG. 2 is a block diagram showing a control construction of a printing device in a first embodiment.

Next, there will be explained the control construction for performing the printing control in respective sections of the printing device. FIG. 2 is a block diagram showing the control construction of a printing device 700 in the present embodiment. A record start signal and quantization data are inputted to a printing control section 500 through an interface 400 from a host device 600. Along with the record start signal, control programs stored in a ROM 402 are performed by a MPU 401. The control program includes, for example, a program for binary processing which selects a dot matrix pattern in FIG. 5A or FIG. 5B to be described later based upon the quantization data (index data) to determine a dot arrangement in one pixel by this pattern (refer to FIG. 6). A gate array 404 performs supply control of image data to a printing head 201 and also performs transfer control of data between the interface 400, the MPU 401 and a DRAM 403. The DRAM 403 is a memory of a dynamic type for storing various data (record start signal, image data supplied to the printing head 201, and the like) and can store the record dot number, the number of times of the printing head replacement and the like. The DRAM 403 also acts as a reception buffer 1001, a development buffer 1004, dot matrix storage units 1002 and 1005 (refer to FIG. 4), which will be described later. Motor drivers 407 and 408 drive a carriage motor 406 for carrying the printing head 201 and a carriage motor 405 for carrying the record medium. A head driver 409 drives the printing head 201.

Figure 13:
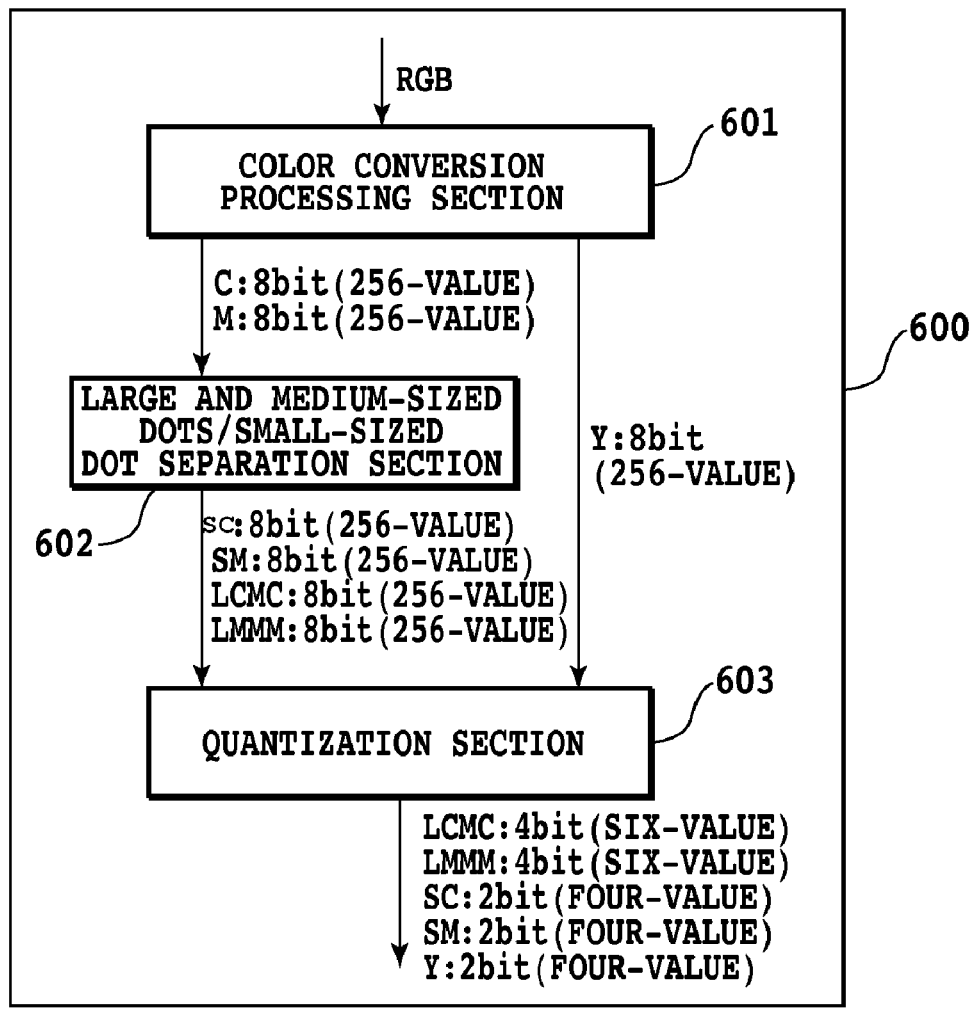
FIG. 13 is a block diagram showing a data processing construction of a host device in the first embodiment.

Next, there will be explained the construction of processing the image data in the host device 600 connected to the printing device 700. FIG. 13 is a block diagram showing the data processing construction in the host device 600 of the present embodiment. The host device 600 is provided with a color conversion processing section 601, a large and medium-size dot/small-size dot separation section 602 and a quantization section 603.

In the color conversion processing section 601, the image data of 8 bits in each of R, G and B are converted into the image data of a multi-value of 8 bits (here, 256 values) corresponding to each ink color used in a printer. Since ink of cyan (C), magenta (M) and yellow (Y) is used in the present embodiment, 256-value data corresponding to each of CMY in the color conversion processing section 601 can be acquired. Among the 256-value data of CMY acquired by the color conversion processing section 601, the 256-value data of CM are inputted to the large and medium-size dot/small-size dot separation section 602. On the other hand, the 256-value data of Y are inputted to the quantization section 603.

The 256-value data of C inputted to the large and medium-size dot/small-size dot separation section 602 are converted into the 256-value data corresponding to large-sized dots of C (LC) and medium-sized dots of C (MC) and the 256-value data corresponding to small-sized dots of C (SC). The 256-value data of LC and MC and the 256-value data of SC converted in this way are outputted from the large and medium-size dot/small-size dot separation section 602. The outputted data are inputted to the quantization section. In regard to the 256-value data of M, as in the case of the above C, the 256-value data of LM and MM and the 256-value data of SM are outputted from the large and medium-size dot/small-size dot separation section 602. It should be noted that the 256-value data of C inputted to the large and medium-size dot/small-size dot separation section 602 corresponds to values (input value) of a lateral axis in each of FIGS. 7 and 14 to be described later. On the other hand, the 256-value data of LC and MC and the 256-value data of SC outputted from the large and medium-size dot/small-size dot separation section 602 correspond to values (output value) of a vertical axis in each of FIGS. 7 and 14 to be described later.

As described above, the 256-value data of LC and MC, the 256-value data of SC, the 256-value data of LM and MM, the 256-value data of SM and the 256-value data of Y are inputted to the quantization section 603. The 256-value data of each inputted to the quantization section 603 are quantized to a N-value data (here, N can be made to a value which differs for each ink). In more detail, the 256-value data of LC and MC, and the 256-value data of LM and MM respectively are quantized to a 6-value data of 4 bits. On the other hand, the 256-value data of SC, and the 256-value data of SM and the 256-value data of Y respectively are quantized to a 4-value data of 2 bits. The multi-value image data thus quantized in the quantization section 603 is called "quantization data" or "multi-value quantization data" In the present specification.
(Explanation of Printing Head)

Next, the printing head 201 will be explained with reference to FIG. 3.

Figure 3:
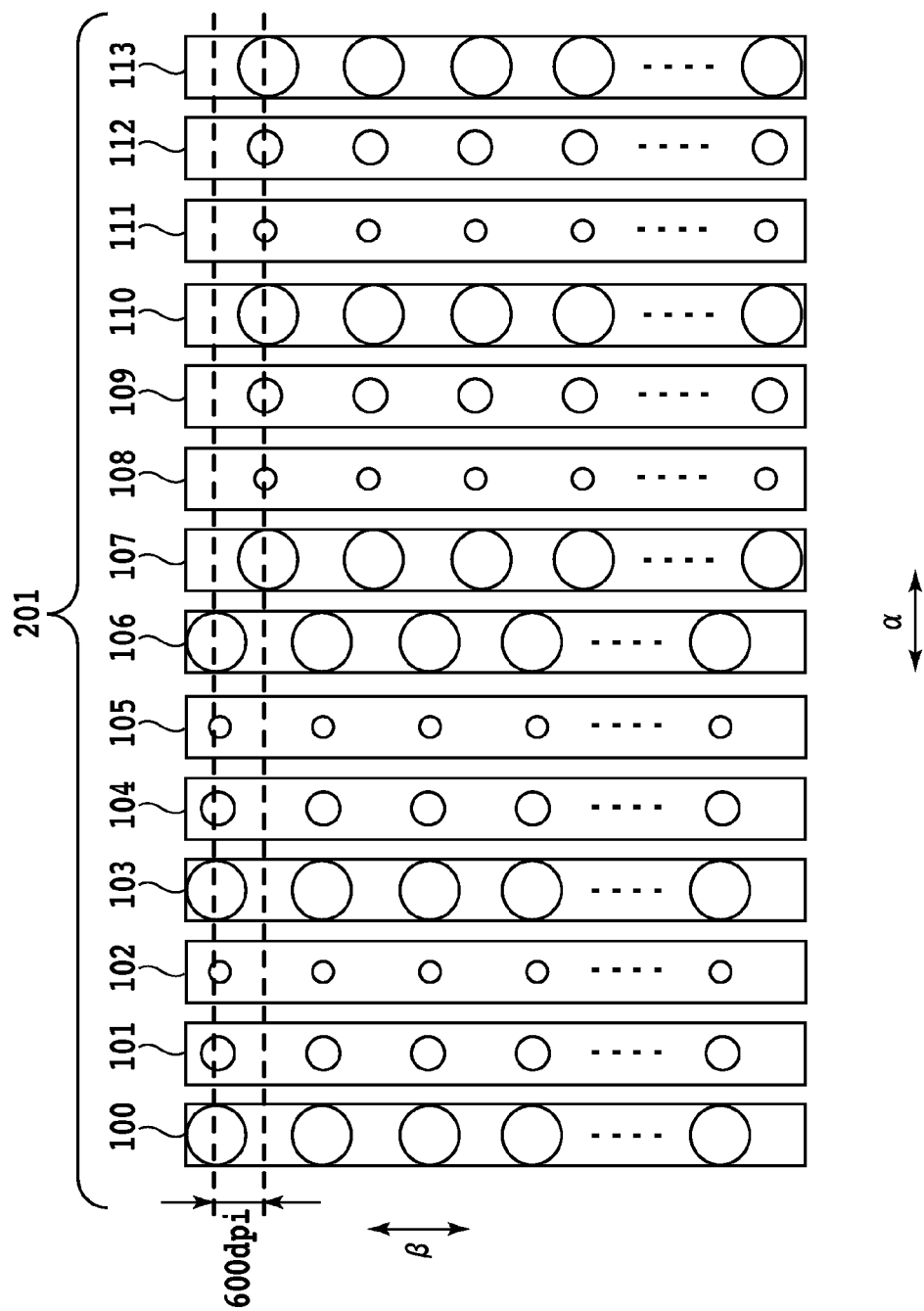
FIG. 3 is a partial pattern diagram showing a major portion of a printing head part of a head cartridge in the first embodiment.

FIG. 3 is a pattern diagram partially showing major portions of the printing head 201 in the head cartridge 1 in the present embodiment. The printing head part is provided with a first printing head 100 for discharging large ink droplets of cyan ink (hereinafter, referred to as large cyan. Hereinafter, likewise ink droplets in other colors and ink droplets in other sizes represent ink droplets with size and color). In addition, the printing head part is also provided with a first printing head 101 for discharging medium ink droplets of cyan ink (medium cyan) and a first printing head 102 for discharging small ink droplets of cyan ink (small cyan). Likewise, the printing head section is also provided with a first printing head 103 for discharging large magenta, a first printing head 104 for discharging medium magenta and a first printing head 105 for discharging small magenta. Further, the printing head section is provided with a first printing head 106 for discharging large yellow and a second printing head 107 for discharging large yellow. In addition, the printing head section is provided with a second printing head 108 for discharging small magenta, a second printing head 109 for discharging medium magenta and a second printing head 110 for discharging large magenta. Further, the printing head section is provided with a second printing head 111 for discharging small cyan, a second printing head 112 for discharging medium cyan and a second printing head 113 for discharging large cyan.

Each printing head is provided with plural ejection ports each having a size corresponding to an amount of ink droplets ejected therefrom. These ejection ports are arranged in a direction perpendicular to the main scanning direction $\alpha$ (sub-scanning direction $\beta$, carriage direction $\Delta$). The first printing head and the second printing head in each color are arranged as a pair along the main scanning direction and are arranged in a so-called symmetric form. In addition, in a case of producing the maximum density, for reducing overlap of dots and increasing a dot coverage coefficient, the ejection port of the first printing head and the ejection port of the second printing head in each color as the pair are arranged to deviate by 600 dpi in the sub-scanning direction $\beta$ from each other. The printing head of such a construction allows the printing with a resolution of 600 dpi (lateral)×600 dpi (vertical). Further, a printing head for discharging ink of black in addition to the above may added.

It should be noted that in the present embodiment, diameters of the ejection ports for forming dots in different sizes differ from each other, but the diameters of the ejection ports may be the same. That is, the printing head may have the form where the ejection ports having the same diameter eject ink of different ejection volumes to form dots in different sizes. For discharging ink of different ejection volumes from the ejection ports having the same diameter, a method for making electrical energy applied to record elements such as the electricity-heat conversion element or the piezo element differ is preferable.
(Featuring Construction)

The present embodiment has the feature in the method for quantizing image data of colors (cyan and magenta) of three kinds or more in size of dots to be recorded.

Figures 5A, 5B:
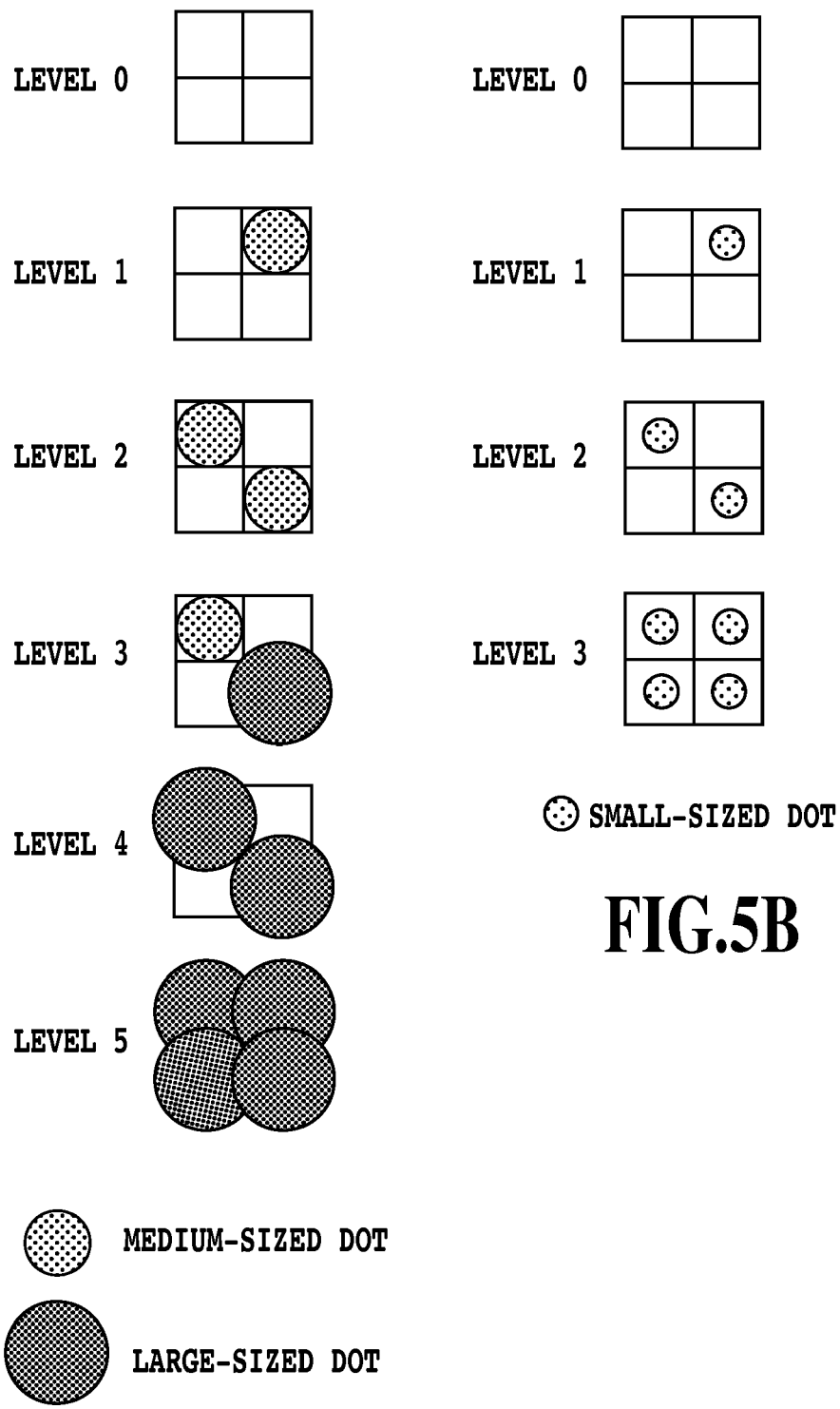
FIG. 5A is a diagram showing a dot matrix pattern allotted to each level of each dot.
FIG. 5B is a diagram showing a dot matrix pattern allotted to each level of each dot.

More specially, image data of large ink droplets (hereinafter, referred to as large-sized dot) and medium ink droplets (hereinafter, referred to as medium-sized dot) are quantized (six valued) together by a resolution of 600 dpi (lateral)×600 dpi (vertical). In addition, dot matrix patterns of 2×2 (first dot arrangement pattern) are allotted based upon the multi-value image data quantized (first quantization data and first multi-value image data) and thereby, the binary processing is carried out. This dot matrix pattern, as shown in FIG. 5A, is a pattern where large-sized and medium-sized dots are arranged corresponding to a signal level shown by the index data. On the other hand, an image data of small ink droplets (hereinafter, also referred to as small-sized dot) is independently quantized (four valued) with a resolution of 600 dpi (lateral)×600 dpi (vertical), apart from the image data of the large and medium-sized dots. In addition, dot matrix patterns of 2×2 (second dot arrangement pattern) are allotted based upon the multi-value image data quantized (second quantization data and second multi-value image data) and thereby, the binary processing is carried out. This dot matrix pattern, as shown in FIG. 5B, is a pattern where small-sized dots only are arranged corresponding to a signal level shown by the index data. Here, known error diffusion processing is used as the method of the quantization.

In this way, in the present embodiment, the binary processing is carried out to the large and medium-sized dots together by using the same dot arrangement pattern (first dot arrangement pattern) based upon the same multi-value quantization data. On the other hand, the binary processing is carried out to the small-sized dots by using the independent dot arrangement pattern (second dot arrangement pattern) based upon the independent multi-value quantization data.

It should be noted that the image data of a color (yellow) having one kind of size of dots to be recorded is independently quantized and the binary processing is carried out by using the dot matrix pattern (refer to FIG. 8) specific to the image data. However, since this is not the feature of the present embodiment, hereinafter an explanation of the binary processing of the image data of yellow is simplified.

Figure 4:
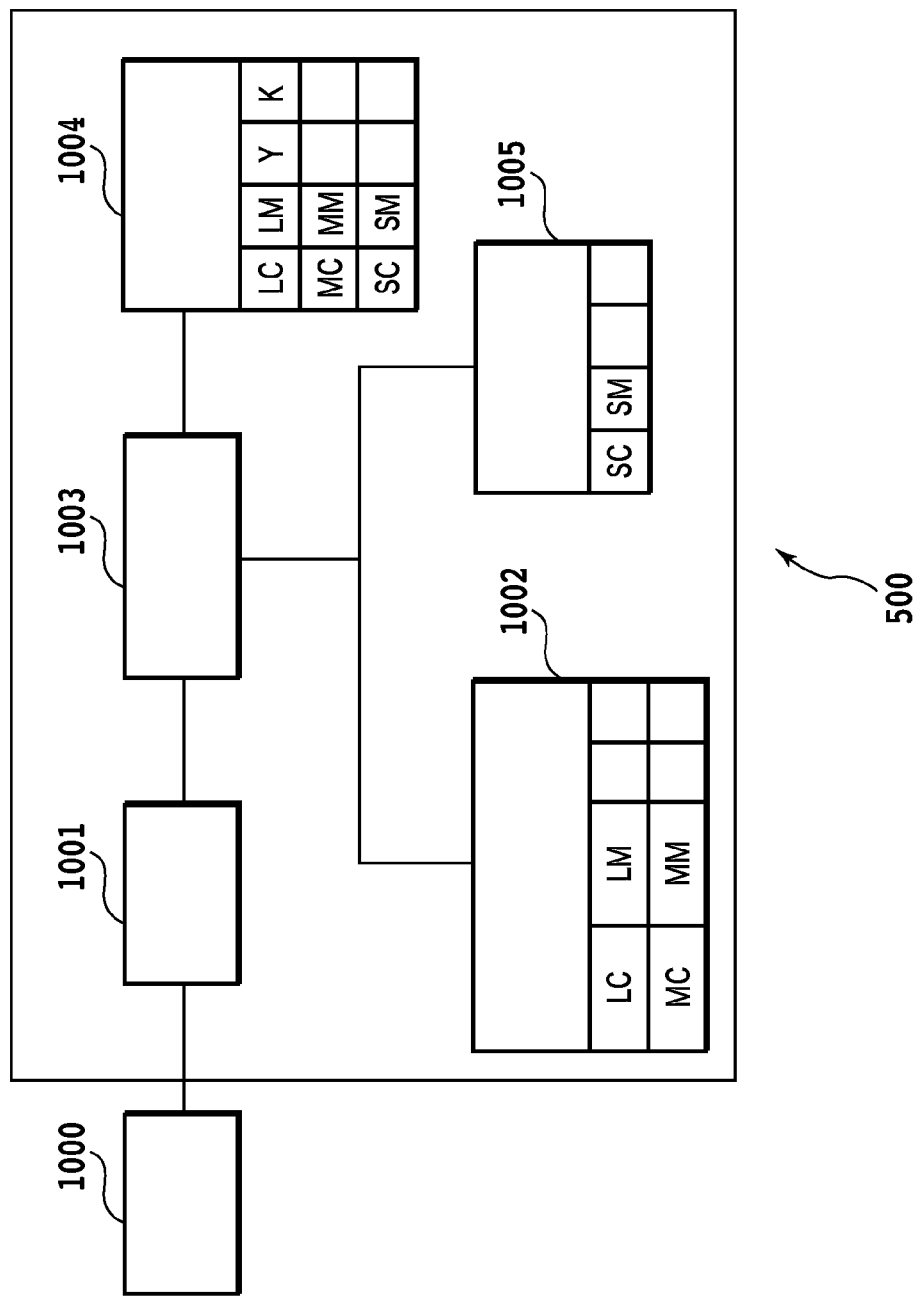
FIG. 4 is a diagram explaining a printing control section construction of an ink jet printing device in the first embodiment.

FIG. 4 is a diagram explaining the printing control section construction of the ink jet printing device in the present embodiment. A printing control section 500 of the ink jet printing device is provided with a reception buffer 1001 for receiving quantization data transmitted from a host device 1000 through the interface 400. The quantization data are data in which an M-value (M=256 in the present embodiment) is quantized to an N-value equal to an M-value or less (3≦N<256). Particularly, in the present embodiment, the quantization data of large and medium-sized dots of cyan and magenta are six-value data quantized to a six-value (refer to FIG. 5A) and the quantization data of small-sized dots of cyan and magenta are four-value data quantized to a four-value (refer to FIG. 5B). In addition, the quantization data of large-sized dots of yellow are four-value data quantized to a four-value (refer to FIG. 8).

In addition, the printing control section 500 is provided with a matrix storage unit 1002 for storing the dot matrix pattern of large and medium-sized dots as shown in FIG. 5A and a matrix storage unit 1005 for storing the dot matrix pattern of small-sized dots as shown in FIG. 5B, which will be described later. Further, the printing control section 500 is provided with a matrix storage unit (not shown) for storing the dot matrix pattern of large-sized dots only as shown in FIG. 8.

In addition, the printing control section 500 is provided with a dot matrix allotment module 1003 for allotting dot matrix patterns to quantization data in the reception buffer 1001. Here, "to allot the dot matrix pattern" is to select a dot matrix pattern corresponding to a signal level of the quantization data. Further, the printing control section 500 is provided with a development buffer 1004 for developing the quantization data to the binary data (dot data) using the dot matrix pattern allotted (selected) by the dot matrix allotment module 1003. A dot arrangement of one pixel is determined by the binary data developed in the development buffer 1004. Accordingly, the dot matrix allotment module 1003 and the development buffer 1004 act as a binary processing section for carrying out the binary processing.

It should be noted that the dot matrix allotment module 1003 is in advance stored in the ROM 402 (refer to FIG. 2) and is a software module executed in the MPU 401 (refer to FIG. 2). In addition, the reception buffer 1001, the matrix storage unit 1002 and the development buffer 1004 respectively are stored in a given address region in the DRAM 403 shown in FIG. 2.

FIG. 5A and FIG. 5B are diagrams showing dot matrix patterns (dot arrangement pattern) allotted to respective levels of respective dots.

FIG. 5A shows dot matrix patterns (first dot arrangement pattern) of large and medium-sized dots corresponding to first quantization data (first multi-value image data) of respective signal levels from levels 0 to 5. In more detail, FIG. 5A shows the dot matrix patterns in which respectively level 0 shows no dot, level 1 shows one medium-sized dot, level 2 shows two medium-sized dots, level 3 shows one medium-sized dot and one large-sized dot, level 4 shows two large-sized dots and level 5 shows four large-sized dots. The printing of one pixel is carried out in this pattern. Thus the binary processing is carried out to the large and medium-sized dots of cyan and magenta together by using the same dot matrix pattern. Thereby, the binary data (first binary data) for forming large and medium-sized dots is generated.

On the other hand, FIG. 5B shows dot matrix patterns (second dot arrangement pattern) of small-sized dots corresponding to second quantization data (second multi-value image data) of respective signal levels from levels 0 to 3. In more detail, FIG. 5B shows the dot matrix patterns in which respectively level 0 shows no dot, level 1 shows one small-sized dot, level 2 shows two small-sized dots and level 3 shows four small-sized dots. The printing of one pixel is carried out in this pattern. Thus the binary processing is carried out to the small-sized dots of cyan and magenta separately from the large and medium-sized dots, by using the dot matrix pattern different from that of the large and medium-sized dots. Thereby, the binary data (second binary data) for forming the small-sized dots is generated. It should be noted that the binary processing is carried out to yellow by using the dot matrix pattern in FIG. 8. FIG. 8 shows dot matrix patterns of large-sized dots corresponding to quantization data of respective signal levels from levels 0 to 3. In more detail, FIG. 8 shows the dot matrix patterns in which respectively level 0 shows no dot, level 1 shows one large-sized dot, level 2 shows two large-sized dots and level 3 shows four large-sized dots. The printing of one pixel is carried out in this pattern. Thus the binary processing is carried out to the large-sized dots of yellow by using the dot matrix pattern different from that of the cyan and magenta.

Figure 6:
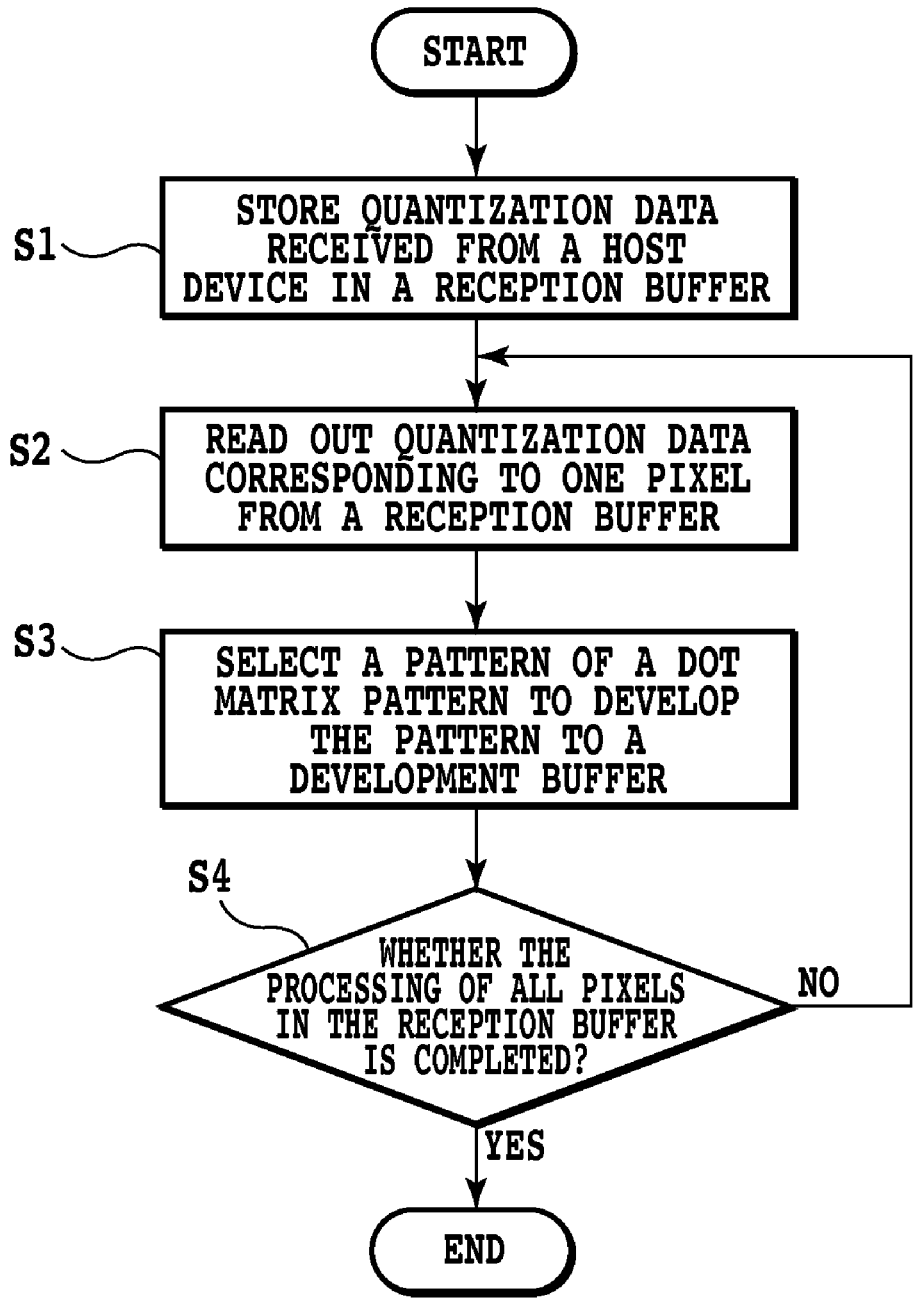
FIG. 6 is a flow chart showing data development processing (binary processing) in the ink jet printing device of the first embodiment.

Next, referring to FIG. 6, there will be explained the procedure in which a pattern is selected among plural dot matrix patterns stored in the dot matrix storage units 1002 and 1005 and the selected pattern is developed to the development buffer 1004. FIG. 6 is a flow chart showing the data development processing (binary processing) in the ink jet printing device of the present embodiment and shows the processing carried out by the dot matrix allotment module 1003.

Here, in a host device 1000, with a resolution of 600 dpi (lateral)×600 dpi (vertical), large and medium-sized dots of cyan and magenta are quantized to a six-value of 4 bits and small-sized dots of cyan and magenta are quantized to a four-value of 2 bits. Here, the error diffusion processing is used as the method of the quantization. There will be explained a case of developing the quantized multi-value image data to binary image data of 1200 dpi (lateral)×1200 dpi (vertical) (dot matrix pattern of 2×2) in the ink jet printing device of the present embodiment. It should be noted that since the binary processing of the image data of yellow is substantially the same as the binary processing of small-sized dots of cyan or magenta, the explanation is omitted. First, at step S1, the quantization data of 4 bits or 2 bits transferred from the host device 1000 is received and the received quantization data is stored in the reception buffer 1001. At next step S2, among the quantization data stored in the reception buffer 1001, the quantization data corresponding to one pixel (4 bits of large and medium-sized dots and 2 bits of small-sized dots) is read out. In addition, at next step S3, a pattern of the dot matrix corresponding to the quantization data corresponding to one pixel read out at step S2 is selected and the pattern of the dot matrix is developed to the development buffer 1004. Inconsequence, the binary data for forming the dot is formed. Next, at step S4, it is confirmed whether or not the development to the development buffer 1004 in regard to all pixels of the image data stored in the reception buffer 1001 at step S1 is completed. When there exits the pixel which is not still developed (case of NO at step S4), the process goes back to step S2. On the other hand, in a case of YES at step S5, this data development processing (binary processing) ends.

Figure 7:
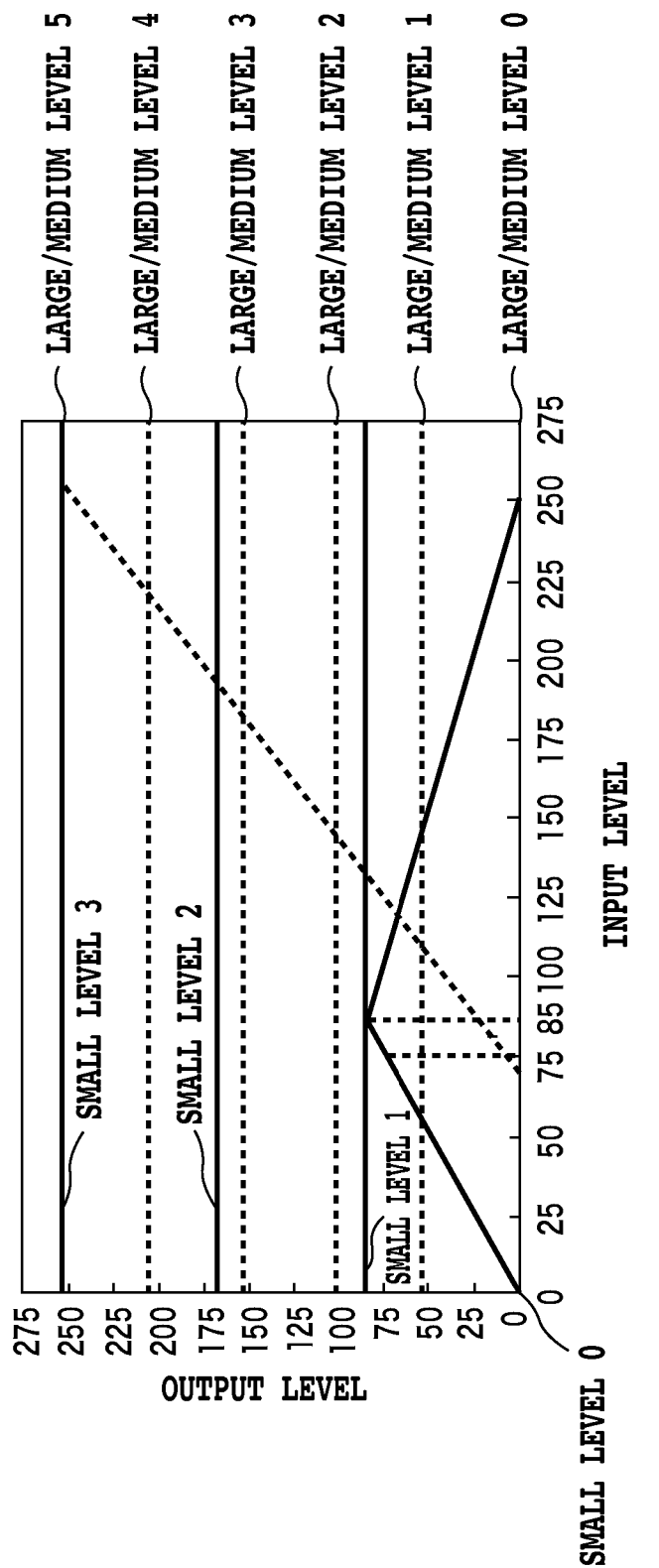
FIG. 7 is a diagram showing values of image data before and after data conversion processing in a large and medium-size dot/small-size dot separation portion of a host device connected to the ink jet printing device of the first embodiment.
Figure 12:
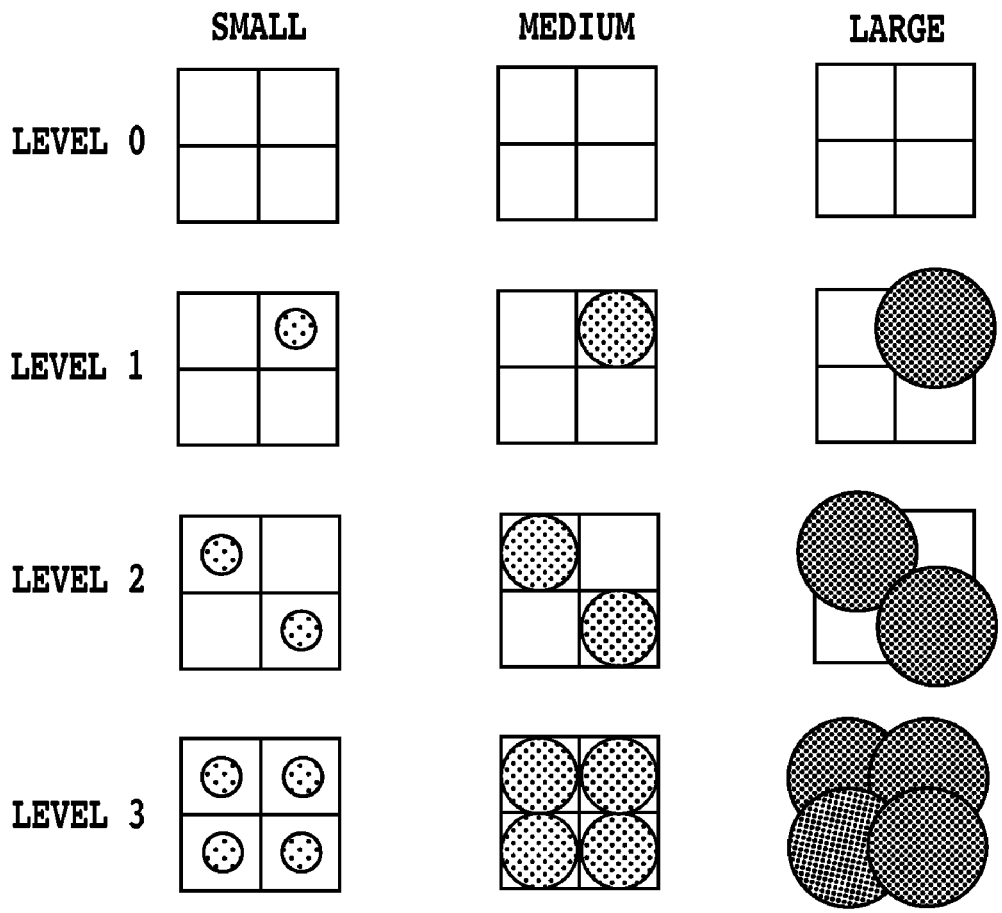
FIG. 12 is a diagram showing dot patterns in a large, medium and small-size independent index.

FIG. 7 is a diagram showing values of image data before and after the data conversion processing carried out in the large and medium-size dot/small-size dot separation section 602 of the host device 600 connected to the ink jet printing device in the present embodiment. Input values in FIG. 7 show image data values of a multi-value (256 values) corresponding to ink colors inputted to the large and medium-size dot/small-size dot separation section 602. On the other hand, output values in FIG. 7 show multi-value image data values of the large and medium-sized dots/small-sized dots outputted from the large and medium-size dot/small-size dot separation section 602. Here, as one example, signal values (output values) after data color conversion processing to input values of 0 to 255 of cyan are described. The output values correspond to multi-value image data values inputted to the quantization section 603 separately between the large and medium-sized dots, and small-sized dots.

In the present embodiment, for quantizing the output value to a four-value in the small-sized dots, the levels are divided into four steps from level 0 to level 3 by the output value. Level 0 shows a step where the output values are from 0 to 255, level 1 shows a step where the output values are from 85 to 255, level 2 shows a step where the output values are from 170 to 255 and level 3 shows a step where the output values are from 255 to 255. It should be noted that FIG. 7 shows a mode of use to level 1 in the small-sized dot and in the present embodiment, level 2 and level 3 are not used in the small-sized dot.

In addition, for quantizing the large and medium-sized dots to a six-value, the levels are divided into six steps from level 0 to level 5 by the output value. Level 0 shows a step where the output values are from 0 to 255, level 1 shows a step where the output values are from 51 to 255, level 2 shows a step where the output values are from 102 to 255, level 3 shows a step where the output values are from 153 to 255, level 4 shows a step where the output values are from 204 to 255 and level 5 shows a step where the output values are from 255 to 255. The dot matrix corresponding to the output level in this way is allotted from the dot pattern corresponding to FIG. 5A or FIG. 5B.

In FIG. 7, level 1 of the large and medium-size same index starts to be outputted at the input values of 70 to 255. The output level of the small-size independent index does not reach level 1 in this input value, but since the large and medium-sized dots, and the small-sized dot respectively use the independent index, the dot output of the large and medium-sized dots can be defined regardless of the output level of the small-sized dot. If the indexes in the present embodiment are the same in the large, medium and small-sized dots, since the outputs of the large, medium and small-sized dots are defined for each level, unless the output value reaches a predetermined level, dots in a different size (for example, medium-sized dot) can not be outputted. However, since in the present embodiment, the index of the large and medium-sized dots is independent from the index of the small-sized dots, the medium-sized dot can start to be used in any input level. In the present embodiment, the medium-sized dot starts to be used at the input values of 70 to 255.

For example, in a case where the same index is used in the large, medium and small-sized dots a shown in FIG. 11, it is not until the level 3 exceeding level 2 that the small-sized dots and the medium-sized dots are mixed in the same pixel. That is, in a case where the same index is used in the medium-sized dots and the small-sized dots, use of respective dots is determined by the dot matrix pattern in each level such as levels 1, 2 or 3. Therefore, the medium-sized dot can not start to be used unless it is timing of level switching, the input level where the medium-sized dot starts to be used is restricted. Therefore, it is difficult to acquire excellent gradation sequence reproduction in a gradation sequence region where the medium-sized dot starts to enter. Particularly, in a case where a difference in ejection volume between the medium-sized dot and the small-sized dot is small, for example, a density difference between level 2 and level 3 is made small in a level (level 3 in FIG. 11) of replacing the medium-sized dot for the small-sized dot. Therefore, the gradation sequence properties are degraded (refer to a disadvantage column of the same index shown in FIG. 10).

However, in a case where the index of the medium-sized dot is independent from the index of the small-sized dot as in the case of the present embodiment, for example, even if the output level of the small-sized dot is between each level, such as level 0.5, level 1.5 or level 2.5, the medium-sized dot can start to be used independently from the small-sized dot. Therefore, the excellent gradation sequence reproduction in the gradation sequence region where the medium-sized dot starts to enter can be acquired. (refer to an advantage column of the independent index shown in FIG. 10).

In addition, in a case of using the index of the large and medium-sized dots and the index of the small-sized dot independently therefrom, a point where the output value of the small-sized dot starts to reduce can be determined regardless of the input and output values of the large and medium-sized dots. The output value of the small-sized dot is made to reduce from the input value of 85 to 255 in FIG. 7, but the output value of the large and medium-sized dots at this time is between level 1 and level 2. A relation of the input/output value of the small-sized dot to the input value of the large and medium-sized dots can be arbitrarily set since the small-sized dot has the independent index. In consequence, since a formation amount of the small-sized dot can be freely determined without restriction of a formation amount of the medium-sized dot, the gradation sequence reproduction in the gradation sequence level in which the medium-sized dot is formed can be increased.

On the other hand, since the large and medium-sized dots have the same index, an arrangement of the medium and large-sized dots in level 3 in which the large-sized dot starts to be outputted as shown in FIG. 7 is defined for each pixel. Since in the present embodiment, as shown in level 3 of FIG. 7, the medium-sized dot is formed in a position different from the large-sized dot in such a manner that it is difficult for the medium-sized dot to overlap over the large-sized dot, the large-sized dot can be made indistinctive at output start of the large-sized dot. By thus using the dot arrangement pattern in such a manner that the medium-sized dot and the large-sized dot do not overlap as much as possible, the granular feeling of the large-sized dot can be restricted (refer to an advantage column of the same index shown in FIG. 10).

Figure 14:
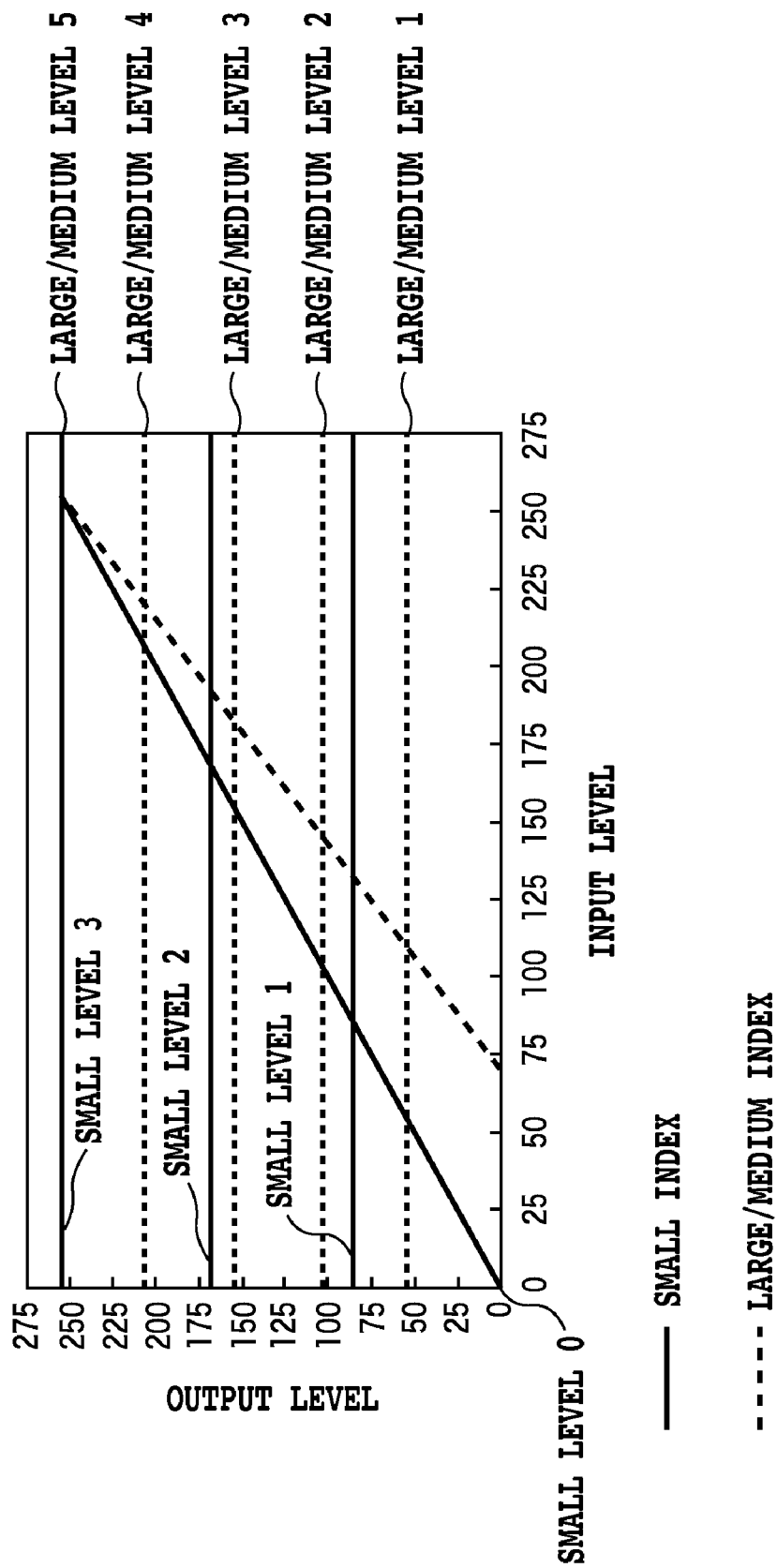
FIG. 14 is a diagram showing a modification of the data conversion processing in the large and medium-size dot/small-size dot separation section of the host device.

It should be noted that as described above, FIG. 7 shows the mode where level 2 and level 3 are not used in regard to the small-sized dot, the present embodiment is not limited thereto. The mode where level 2 and level 3 are used in regard to the small-sized dot may be adopted. For example, FIG. 14 shows the mode where level 2 and level 3 are used in regard to the small-sized dot, wherein all of level 0 to level 3 are used in regard the small-sized dot. When the use level number of the small-sized dots is increased as shown in FIG. 14, the gradation sequence number possible to be expressed can be increased as compared to that in FIG. 7.

As described above, in the present embodiment, first, among plural kinds (here, three kinds) of dots, a first quantization data for forming two kinds of dots (large and medium-sized dots) and a second quantization data for forming another kind of dots (small-sized dot) are acquired. Next, by selecting a first dot arrangement pattern for forming the two kinds of dots (large and medium-sized dots) based upon the first quantization data, a first binary data for forming the two kinds of the dots (large and medium-sized dots) are generated. On the other hand, by selecting a second dot arrangement pattern for forming the another kind of dots (small-sized dots) based upon the second quantization data, a second binary data for forming the another kind of the dots (small-sized dots) are generated. Finally, the large, medium and small-sized dots are formed based upon the first and second binary data.

According to such first embodiment, in regard to two kinds of dots (large and medium-sized dots) among plural kinds (here, three kinds) of the dots, the binary processing is carried out by using the same dot arrangement pattern based upon the same quantization data (first multi-value image data). On the other hand, in regard to another kind of dots (small-sized dots), the binary processing is carried out by using another dot arrangement pattern different from the two kinds of the dots based upon the quantization data (second multi-value image data) different from the quantization data for forming the two kinds of the dots. In consequence, the granular feeling of the dot in a density region (gradation sequence level) where the dot of a different size starts to enter can be reduced, enabling the printing in which it is difficult for the gradation sequence properties to be degraded.

Second Embodiment

Hereinafter, a second embodiment in the present invention will explained with reference to the drawings.

The second embodiment in the present invention is configured in such a manner that a combination of a dot size for each color of ink differs. That is, cyan has a large-sized dot, magenta has a medium-sized dot, black has a small-sized dot, red has a large-sized dot, green has a medium-sized dot and yellow has a large-sized dot only. The reason why red has a large-sized dot and green has a medium-sized dot is that the red and the green are not basic colors and are rarely used independently, and therefore, use frequency of small-sized dots is low. In addition, elimination of the ejection port of the small-sized dot causes the chip size of the printing head to be made small. The reason why the yellow has the large-sized dot only is that since the yellow has a high brightness and a low visibility, the dot having a small ejection volume is not required.

The other major construction is substantially the same as in the first embodiment.

In regard to the index of the present embodiment, cyan, magenta and black have the large and medium-size same index and the small-size independent index, red and green have the large and medium-size same index and yellow only has the independent index of the large-sized dot only. That is, it can be selected whether image data of dots each having a different size for each color are quantized together or independently. In detail, in regard to cyan and magenta, the binary processing is carried out by using the dot arrangement pattern in FIG. 5A and on the other hand, in regard to black, the binary processing is carried out by using the dot arrangement pattern in FIG. 5B. In addition, in regard to red and green, the binary processing is carried out by using the dot arrangement pattern in FIG. 5A and on the other hand, in regard to yellow, the binary processing is carried out by using the dot arrangement pattern in FIG. 8. In the present embodiment, sequence of the data development processing carried out by the dot matrix allotment module 1003 is basically the same as in the case of the first embodiment. A different point thereof is that the data development processing of cyan and magenta, black, red and green, yellow are independently carried out.

As explained above, according to the present embodiment, a combination of the quantization of the image data of dots each having a different size for each color is independently selected for each color, thus making it possible to realize an optimal quantization method of the entire system.

Third Embodiment

Hereinafter, a third embodiment in the present invention will be explained with reference to the drawings.

In the first embodiment described above, dots of three kinds of sizes are used in regard to each of cyan and magenta, but the sizes for the same color dot are not limited to the three kinds. The sizes for the same color dot may have three kinds or more and in the third embodiment, the kind of dots having different sizes comprises four kinds of extremely small, small, medium and large sizes. The ejection port of the printing head has four kinds of extremely small, small, medium and large sizes corresponding to the size kinds of the dots. The present invention can be applied to the printing head provided with such ejection ports having three kinds of sizes or more.

Use of extremely small-sized ink allows a further improvement on the granular properties at a highlighted portion, but the input start of the dot tends to easily stand out. Therefore, the extremely small-sized and the small-sized dots have the same index where the input start of the dot is difficult to stand out and since the gradation sequence properties are desired not to be degraded in the medium gradation, the large and medium-sized dots have the large and medium-size same index as in the case of the first embodiment for using different indexes between the small-sized dot and the medium-sized dot. In consequence, two kinds of dots (extremely small-sized dot and small-sized dot) use the same index and other two kinds of dots (large small-sized dot and medium-sized dot) use the same index.

In the present embodiment, sequence of the data development processing carried out by the dot matrix allotment module 1003 is basically the same as in the case of the first embodiment. A different point thereof is that the dot matrix pattern storage unit of the small-sized dot becomes the extremely small-sized dot and small-sized dot common storage unit and data where the extremely small-sized dot and the small-sized dot are quantized together are allotted to the dot matrix. The other construction is the same as in the first embodiment.

FIG. 9 shows the same index of extremely small-sized dots and small-sized dots in the present embodiment. The same index of extremely small-sized dots and small-sized dots has an image data of six values (level 0 to level 5) quantized in 4 bits as in the case of the large and medium-size same index.

It should be noted that the extremely small-sized dot is easily affected by external disturbances because of the small diameter from a point where the dot is ejected to a point where it clashes. The representative of the disturbances includes self-air stream by the ejected dot and inflow air stream as a result of heading scanning. There may be a case of restricting the formation of the extremely small-sized dot when the dot is largely affected by such air stream. By reducing the formation, the self-air stream can be restricted and the number of dots affected by the air stream can be reduced. For example, in a case where the ejection number of the extremely small-sized dot is limited to 0.8/600 dpi or 1.5/600 dpi at a maximum because of the air stream, when the extremely small-sized dot and the small-sized dot use the same index, the input/output value of the small-sized dot is also restricted as a result of the limitation to the extremely small-sized dot. Therefore, in this case, the extremely small-sized dot and the small-sized dot respectively may use the independent index, and the large and medium-sized dots only may use the same index.

According to the third embodiment as described above, in regard to two kinds of dots (large and medium-sized dots) among plural kinds (here, four kinds) of the dots, the binary processing is carried out by using the same dot arrangement pattern based upon the same quantization data (first multi-value image data). On the other hand, in regard to another two kinds of dots (small-sized and extremely small-sized dots), the binary processing is carried out by using another dot arrangement pattern different from the two kinds of the dots based upon the quantization data (second multi-value image data) different from the quantization data for forming the two kinds of the dots. In consequence, the granular feeling of the dot at a highlighted portion is further improved, enabling the printing in which it is difficult for the dot to stand out and also it is difficult for the gradation sequence properties to be degraded.

Further, depending on the record application, among four kinds of dots, three kinds of dots in the order of the size may use the same index and one kind of dots (extremely small-sized dot) only may use the independent index.

In consideration of the first to third embodiments thus, among three kinds or more of dots, in regard to at least two kinds of dots (for example, a combination of large and medium-sized dots or a combination of large, medium and small-sized dots), the binary processing is carried out by using the same dot arrangement pattern based upon the same quantization data. On the other hand, in regard to at least another kind of dots (for example, small-sized dots or a combination of small and extremely small-sized dots), the binary processing is carried out by using the dot arrangement pattern different from the two kinds of the dots based upon the quantization data different from the two kinds of the dots. Here, it is preferable that at least the two kinds of the dots, among three kinds or more of the dots, include the largest-sized dot (large-sized dot) and the second largest-sized dot (medium-sized dot).

In addition, it is preferable that at least another kind of the dots includes the smallest-sized dot (small-sized dot or extremely small-sized dot) and the mode including the smallest-sized dots (extremely small-sized dot) and the second smallest-sized dots (small-sized dot) may be used. In consequence, the granular feeling of the dot in a density region (gradation sequence level) where the dot of a different size starts to enter can be reduced, enabling the printing in which it is difficult for the gradation sequence properties to be degraded.

Other Embodiment

The color for realizing different dot sizes is not limited to the cyan and magenta, but may be black. The black dot has three kinds of large, medium and small sizes or more and thereby, black-white photos with higher quality can be produced.

In addition, in the first to third embodiments as described above, the ink jet printing device carries out the binary processing including allotment (selection) of the dot matrix pattern, but the host device may carry out it. In a case of carrying out the binary processing by the host device, the function of the printing control section 500 in FIG. 4 is realized in the host device. In this way, the binary processing which is the feature of the present invention may be carried out by any of the ink jet printing device or the host device connected to the ink jet printing device. The device for carrying out the binary processing corresponds to the data processing device of the present invention. For example, in a case of carrying out the binary processing by the ink jet printing device, the ink jet printing device constitutes the data processing device and in a case of carrying out the binary processing by the host device, the host device constitutes the data processing device.

In addition, in the first to third embodiments as described above, N valued processing is carried out with quantization in the host device, but may be carried out in the ink jet printing device. In a case of carrying out the N valued processing with quantization in the ink jet printing device, the binary processing is carried out in the ink jet printing device.

It should be noted that the present invention may be applied to a system constructed of plural units (for example, a host computer, an interface unit, a reader, a printer and the like) or a device constructed of one unit (for example, a printer, a copier, a facsimile device or the like). The system constructed of the ink jet printing device (printer) and the host device is called an ink jet printing system and it is preferable that the present invention is applied to this ink jet printing system. In addition, in a case of applying the present invention to the device constructed of one unit. The device constructed of the one unit corresponds to the data processing device.

In addition, an object of the present invention may be achieved in such a manner that the memory medium for printing program codes of software for realizing the function of the aforementioned embodiment is supplied to a system or a device and the system or the device reads out and carries out the program codes stored in the memory medium.

In this case, the program code itself read out from the memory medium realizes the function of the aforementioned embodiment and the memory medium or the program storing the program code constitutes the present invention. The program of the present invention corresponds to, for example, the program (refer to FIG. 6) of the binary processing of selecting the dot matrix pattern in FIG. 5A, 5B or FIG. 9 based upon quantization data (index data) to generate binary data.

The memory medium for supplying the program code may include, for example, a floppy disc, a hard disc, an optical disc, an optical magnetic disc, a CD-ROM, a CD-R, a magnetic tape, an involatile memory card, a ROM and the like.

Without mentioning, there may be included a case where an OS (operating system) or the like working on a computer carries out a part or all of the actual processing based upon an instruction of the program code and the function of each aforementioned embodiment is achieved by this processing.

Further, without mentioning, there is included a case where the program code read out from the memory medium is written in a memory provided in a function expansion board inserted in a computer or a function expansion unit connected to the computer and after that, a CPU provided in the function expansion board or the function expansion unit carries out a part or all of the actual processing based upon an instruction of the program code and the function of each aforementioned embodiment is achieved by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-214040, filed Aug. 20, 2007, which is hereby incorporated by reference herein in its entirety.

What is claimed is:

1. A data processing device comprising:
a generating unit which generates binary data corresponding to a first dot and a second dot smaller than the first dot by using a first dot arrangement pattern for determining an arrangement of the first dot and the second dot based upon a first multi-value image data for showing gradation corresponding to the first dot and the second dot and generates the binary data corresponding to a third dot smaller than the second dot by using a second dot arrangement pattern for determining an arrangement of the third dot based upon a second multi-value image data for showing gradation corresponding to the third dot.

2. The data processing device according to claim 1, wherein the generating unit generates the binary data corresponding to a fourth dot smaller than the third dot by using the second dot arrangement pattern based upon the second multi-value image data.

3. The data processing device according to claim 1, further comprising:
a quantization device which quantizes a multi-value image data for forming the dot of the same color, thus generating the first and second multi-value image data.

4. A data processing method for generating binary data corresponding to a first dot, a second dot smaller than the first dot and a third dot smaller than the second dot comprising the steps of:
generating the binary data corresponding to the first and second dots by using a first dot arrangement pattern based upon a first multi-value image data for forming the first and second dots; and
generating the binary data corresponding to the third dot by using a second dot arrangement pattern different from the first dot arrangement pattern based upon a second multi-value image data for forming the third dot.

5. A data processing device for generating binary data corresponding to each of three or more kinds of dots, each having a different size, for forming the three or more kinds of dots comprising:
a binary processing device which generates the binary data corresponding to at least two kinds of dots by using a first dot arrangement pattern based upon a first quantization data for forming the at least two kinds of dots and generates the binary data corresponding to at least another kind of dot by using a second dot arrangement pattern different from the first dot arrangement pattern based upon a second quantization data different from the first quantization data for forming the at least another kind of dot different from the at least two kinds of dots.

6. The data processing device according to claim 5, further comprising:
a quantization device which generates the first and second quantization data by quantizing a multi-value image data.

7. The data processing device according to claim 5, wherein the at least two kinds of dots include a largest-sized dot and a second largest-sized dot among the three or more kinds of dots; and the at least another kind of dot includes a smallest-sized dot among the three or more kinds of dots.

8. The data processing device according to claim 7, wherein the three or more kinds of dots comprise three kinds of dots including the largest-sized dot, the second largest-sized dot and the smallest-sized dot.

9. The data processing device according to claim 7, wherein the three or more kinds of the dots comprise four kinds of dots including the largest-sized dot, the second largest-sized dot, the smallest-sized dot and a second smallest-sized dot.

10. The data processing device according to claim 5, wherein the at least two kinds of dots and the at least another kind of dot include dots of the same color.

11. The data processing device according to claim 5, wherein the at least two kinds of dots and the at least the another kind of dot include dots of different colors.

12. The data processing device according to claim 5, wherein the data processing device includes an ink jet printing device for carrying out printing on a printing medium by using a printing head for forming the three or more kinds of dots having different sizes.

13. The data processing device according to claim 5, wherein the data processing device includes a computer connected to an ink jet printing device for carrying out printing on a printing medium by using a printing head for forming the three or more kinds of dots having different sizes.

14. An ink jet printing system including an ink jet printing device for printing on a printing medium three or more kinds of dots each having a different size and a host device connected to the ink jet printing device comprising:
a device which generates a first quantization data for forming at least two kinds of dots and generates a second quantization data different from the first quantization data for forming at least another kind of dot different from the at least two kinds of dots; and
a generating unit which generates a binary data corresponding to the at least two kinds of dots, the second kind of dot being smaller than the first kind of dot, by using a first dot arrangement pattern for determining the arrangement of the first kind of dot and the second kind of dot based upon the first quantization data for showing gradation corresponding to the at least two kinds of dots and generates a binary data corresponding to the at least another kind of dot, which is smaller than the second kind of dot, by using a second dot arrangement pattern based upon the second quantization data for showing gradation corresponding to the at least another kind of dot.

15. A data processing method for generating a binary data corresponding to each of three or more kinds of dots, each having a different size, for forming the three or more kinds of dots comprising the steps of:
generating the binary data corresponding to at least two kinds of dots, the second kind of dot being smaller than the first kind of dot, by using a first dot arrangement pattern for determining an arrangement of the first kind of dot and the second kind of dot based upon a first quantization data for showing gradation corresponding to the at least two kinds of dots; and
generating the binary data corresponding to at least another kind of dot, which is smaller than the second kind of dot, by using a second dot arrangement pattern based upon a second quantization data for showing gradation corresponding to the at least another kind of dot.

* * * * *